United States Patent [19]

Moriya et al.

[11] Patent Number: 4,665,131

[45] Date of Patent: May 12, 1987

[54] BLOCK COPOLYMER

[75] Inventors: Yasuo Moriya; Nobuyoshi Suzuki; Toru Deguchi, all of Aichi, Japan

[73] Assignee: Nippon Oil and Fats Company, Ltd., Tokyo, Japan

[21] Appl. No.: 871,912

[22] Filed: Jun. 9, 1986

[30] Foreign Application Priority Data

Jun. 14, 1985 [JP] Japan ................... 60-127992
Jun. 14, 1985 [JP] Japan ................... 60-127993

[51] Int. Cl.$^4$ ................................ C08F 293/00
[52] U.S. Cl. ................... 525/277; 525/299; 525/93; 525/94; 526/314
[58] Field of Search ............... 525/277, 299; 526/314

[56] References Cited

U.S. PATENT DOCUMENTS 2,575,585 11/1951 Cox et al. ................... 526/314
4,303,762 12/1981 Nakayama et al. ........... 525/299

FOREIGN PATENT DOCUMENTS 0127717 7/1983 Japan ................... 525/277

Primary Examiner—Wilbert J. Briggs, Jr.
Attorney, Agent, or Firm—Parkhurst & Oliff

[57] ABSTRACT

A block copolymer consisting of segments of copolymer A, which is obtained by copolymerizing a (meth)acrylic acid ester monomer with a radically copolymerizable peroxycarbonate and has peroxy groups in its main polymer chain, and segments of (co)polymer B, which is different from copolymer A in the monomer composition and does not contain peroxy groups, can modify matrix resin without deteriorating the mechanical property of the resin.

9 Claims, No Drawings

BLOCK COPOLYMER

BACKGROUND OF THE INVENTION

1. Field of the Invention

The present invention relates to a block copolymer consisting of segments of copolymer A, which is obtained by copolymerizing a (meth)acrylic acid ester monomer with a peroxycarbonate and has peroxy groups in its main polymer chain, and segments of (co)polymer B, which is different from copolymer A in the monomer composition and does not contain peroxy groups, and which block copolymer is useful for modifying resin and the like.

2. Related Art Statement

There have recently been predominantly investigated various methods for giving a functional group to a copolymer corresponding to the development of new technic of polymer blend. Particularly, a polymer having a functional group in its main polymer chain has a high reactivity and is a very attractive polymer.

For example, Plaste und Kautschuku, 26(3), 121 (1979) proposes a copolymer, which has been obtained by copolymerizing a peroxide having a (meth)acrylic type double bond with a (meth)acrylic acid ester monomer, and has peroxy groups in its main polymer chain.

Japanese Patent Application Publication No. 30,790/80 discloses, as a polymer containing peroxy bonds similarly to the above, a radically copolymerizable peroxycarbonate having an allyl type double bond represented by the following general formula (II)

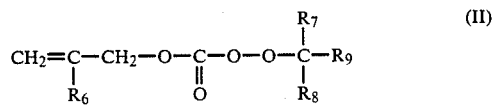

wherein $R_6$ represents a hydrogen atom or an alkyl group having 1–4 carbon atoms; $R_7$ and $R_8$ represent same or different alkyl groups having 1–4 carbon atoms; and $R_9$ represents an alkyl group having 1–12 carbon atoms or a cycloalkyl group having 3–12 carbon atoms.

Copolymers of this radically copolymerizable peroxycarbonate having an allyl type double bond with vinyl chloride are disclosed in Japanese Patent Application Publication Nos. 26,617/82 and 26,619/82, a copolymer of this peroxycarbonate with ethylene-vinyl acetate is disclosed in Japanese Patent Laid-open Specification No. 139,514/81, a copolymer of this copolymer with diallyl phthalate is disclosed in Japanese Patent Application Publication No. 50,802/82, and a copolymer of this peroxycarbonate with vinyl acetate is disclosed in Japanese Patent Application Publication No. 42,083/82. The fact that the resulting copolymers have self-crosslinking property and graft performance has already been ascertained.

However, when it is intended to blend these copolymers with other resin, a grafting reaction occurs locally due to the absence of compatibility between the copolymer and the resin, and hence the resulting resin blend is poor in mechanical strength and is further poor in physical properties due to the phase separation.

Further, the radically copolymerizable peroxycarbonate represented by the above described general formula (II) has a good copolymerizability with a monomer having a non-conjugated double bond due to its allyl type double bond, but has a drawback that the peroxycarbonate does not copolymerize with a conjugated type monomer, such as aromatic vinyl monomer, (meth)acrylic acid ester monomer or the like. In order to eliminate this drawback, there has been attempted to add a monomer copolymerizable with both the peroxycarbonate and the conjugated type monomer to the polymerization system. However, this method still has a drawback that aimed physical properties are not fully developed due to the addition of the copolymerizable monomer.

Recently, there have been developed methods for producing various block copolymers, and there has been attempted to produce a resin blend having novel properties by blending the resulting block copolymer with other resin, for example, under a melted state. According to this method, a large phase separation does not occur in the resin blend due to the properties of the block copolymer, and a homogeneous resin blend can be obtained. However, chemical bonds are not present at the interface of the blended resins, and therefore the resulting resin blend has such a drawback that the resin blend has a very low mechanical strength.

In order to eliminate those drawbacks, the inventors have disclosed in Journal of Technical Disclosure No. 83-6603 published by Japan Institute of Invention and Innovation a block copolymer consisting of segments of copolymer (a) and segments of copolymer (b), wherein only copolymer (a) contains peroxycarbonate groups. This block copolymer has such excellent properties that this block copolymer exhibits excellent dispersion stability in the blending with other resin and further exhibits high strength at the interface with other resin. However, this block copolymer still has the following drawbacks. That is, the double bond-containing peroxide to be used in the production of copolymer (a) is a radically copolymerizable peroxycarbonate represented by the general formula (II), and hence the monomer to be used in the production of copolymer (a) is limited to monomers having unconjugated double bonds, such as vinyl acetate, vinyl chloride and the like, and the use of such monomers having unconjugated double bond affects adversely the heat resistance, weather resistance, chemical resistance, electrical insulation property and the like in the resulting resin blend. Moreover, copolymer (b) is polystyrene, and therefore the use of the block copolymer having segments of copolymer (B) can give rigidity, surface gloss and the like to the resulting resin blend, but is difficult to give shock impact resistance, weather resistance and the like to the resin blend.

OBJECT AND SUMMARY OF THE INVENTION

The inventors have made various inventions in order to solve these drawbacks of conventional block copolymers, and found out that a block copolymer consisting of segments of copolymer A and segments of (co)polymer B, which copolymer A has been obtained by copolymerizing a (meth)acrylic acid ester monomer with a radically copolymerizable peroxycarbonate and contains peroxy groups in its main polymer chain, and which (co)polymer B is different from copolymer A in the monomer composition and does not contain peroxy groups, can solve all the problems in the conventional block copolymer. As the result, the inventors have accomplished the present invention.

The inventors have further made investigations and found out that, when the above described monomer mixture for copolymer A is mixed with a radically copolymerizable monomer copolymerizable with the (meth)acrylic acid ester monomer, the glass transition temperature of (meth)acrylic acid ester polymer can be controlled, and a good result can be obtained.

That is, the first aspect of the present invention lies in a block copolymer consisting of 5–95% by weight of segments of copolymer A and 95–5% by weight of segments of (co)polymer B, said copolymer A having been obtained by copolymerizing 80–99.5% by weight of a (meth)acrylic acid ester monomer with 0.5–20% by weight of a radically copolymerizable peroxycarbonate represented by the following general formula (I), said (co)polymer B having been obtained by polymerizing at least one radically (co)polymerizable monomer in the absence of a radically copolymerizable peroxycarbonate represented by the following general formula (I) and having a monomer composition different from that of the above described copolymer A, and said general formula (I) being

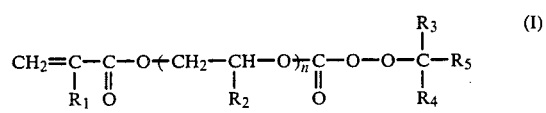

wherein $R_1$ represents a hydrogen atom or an alkyl group having 1 or 2 carbon atoms; $R_2$ represents a hydrogen atom or a methyl group; $R_3$ and $R_4$ represent the same or different alkyl groups having 1–4 carbon atoms; $R_5$ represents a phenyl group or an alkyl group or alkyl-substituted phenyl group having 1–12 carbon atoms or a cycloalkyl group having 3–12 carbon atoms; and n is a positive integer of 1 or 2.

The second aspect of the present invention lies in a block copolymer consisting of 5–95% by weight of segments of a copolymer A and 95–5% by weight of segments of (co)polymer B, said copolymer A having been obtained by copolymerizing 50–99.4% by weight of a (meth)acrylic acid ester monomer with 0.1–30% by weight of a monomer copolymerizable with the (meth)acrylic acid ester monomer and 0.5–20% by weight of a radically copolymerizable peroxycarbonate represented by the above described general formula (I), and said (co)polymer B having been obtained by polymerizing at least one radically (co)polymerizable monomer in the absence of a radically copolymerizable peroxycarbonate represented by the above described general formula (I) and having a monomer composition different from that of the above described copolymer A.

DESCRIPTION OF THE PREFERRED EMBODIMENT

In the present invention, (meth)acrylic acid ester monomer is used as an essential monomer component for the production of copolymer A. The reason is that (meth)acrylic acid ester polymer is excellent in heat resistance, weather resistance and workability. Further (meth)acrylic acid ester polymer derived from long chain alcohol has rubber elasticity and is effectively used as an improver for shock impact resistance.

The (meth)acrylic acid ester monomers to be used in the present invention include methyl(meth)acrylate, ethyl(meth)acrylate, i-propyl(meth)acrylate, n-propyl(meth)acrylate, n-butyl(meth)acrylate, 2-ethylhexyl(meth)acrylate, lauryl(meth)acrylate, stearyl(meth)acrylate and their mixtures, and the like. Among them, methyl(meth)acrylate, ethyl(meth)acrylate, n-butyl(meth)acrylate, 2-ethylhexyl(meth)acrylate and their mixture are preferable.

In the first aspect of the present invention, the (meth)acrylic acid ester monomer is used in an amount of 80–99.5% by weight, preferably 85–99.0% by weight, based on the total amount of the monomer mixture for the production of copolymer A, which consists of the (meth)acrylic acid ester monomer and the radically copolymerizable peroxycarbonate represented by the general formula (I). When the amount of the (meth)acrylic acid ester monomer is less than 80% by weight, the resulting copolymer A has no longer the property inherent to (meth)acrylic acid ester copolymer, and moreover the amount of the radically copolymerizable peroxycarbonate represented by the general formula (I) is inevitably more than 20% by weight, resulting in the gellation of the copolymer A during the polymerization. While, when the amount of the (meth)acrylic acid ester monomer exceeds 99.5% by weight, the amount of the radical copolymerizable peroxycarbonate represented by the general formula (I) is inevitably decreased to less than 0.5% by weight, and sufficiently large amount of peroxycarbonate groups can not be introduced into the resulting copolymer A. As the result, the resulting block copolymer has a low active oxygen content of less than 0.002% by weight, and is very poor in the graft efficiency onto other resin at the blending with the resin due to the low active oxygen content. That is, less than 80% by weight, or more than 99.5% by weight of the (meth)acrylic acid ester monomer should not be used.

In the present invention, the radically copolymerizable peroxycarbonate represented by the general formula (I) is also used as an essential monomer component for the production of copolymer A. Because, when the radically copolymrizable peroxycarbonate has been introduced into copolymer A, the peroxycarbonate is thermally decomposed during the melting of the mixture of the block copolymer with other matrix resin to cause a grafting reaction of the block copolymer onto the other matrix resin.

The radically copolymerizable peroxycarbonates to be used in the present invention include t-butylperoxy acryloyloxyethylcarbonate, t-hexylperoxy acryloyloxyethyl carbonate, 1,1,3,3-tetramethylbutylperoxy acryloyloxyethyl carbonate, cumylperoxyacryloyloxyethyl carbonate, p-isopropylcumylperoxy acryloyloxyethyl carbonate, t-butylperoxy methacryloyloxyethyl carbonate, t-amylperoxy methacryloyloxyethyl carbonate, 1,1,3,3-tetramethylbutylperoxy methacryloyloxyethyl carbonate, cumylperoxy methacryloyloxyethyl carbonate, t-butylperoxy acryloyloxyethoxyethyl carbonate, t-hexylperoxy acryloyloxyethoxyethyl carbonate, cumylperoxy acryloyloxyethoxyethyl carbonate, t-butylperoxy methacryloyloxyethoxyethyl carbonate, t-amylperoxy methacryloyloxyethoxyethyl carbonate, cumylperoxy methacryloyloxyethoxyethyl carbonate, t-butylperoxy acryloyloxyisopropyl carbonate, t-hexylperoxy acryloyloxyisopropyl carbonate, 1,1,3,3-tetramethylbutylperoxy acryloyloxyisopropyl carbonate, cumylperoxy acryloyloxyisopropyl carbonate, t-butylperoxy methacryloyloxyisopropyl carbonate, t-amylperoxy methacryloyloxyisopropyl carbonate, 1,1,3,3-tetramethylbutylperoxy methacryloyloxyisopropyl carbonate, cumylperoxy methacryloyloxyisopropyl carbonate, and the like. Among them, there can be preferably used t-butylperoxy acryloyloxyethyl carbonate, t-hexylperoxy acryloyloxyethyl carbonate, t-butylperoxy methacryloyloxyethyl carbonate, t-hexylperoxy methacryloyloxyethyl carbonate, and t-butylperoxy acryloyloxyethoxyethyl carbonate.

In the first aspect of the present invention, the peroxycarbonate represented by the general formula (I) is used in an amount of 0.5-20% by weight, preferably 1-15% by weight, based on the total amount of the monomer mixture for the production of copolymer A. When the amount of the peroxycarbonate is less than 0.5% by weight, the amount of peroxycarbonate groups to be introduced into copolymer A is too small, resulting in less than 0.002% by weight of active oxygen content in the resulting block copolymer. Accordingly, the block copolymer is very low in the graft efficiency onto other resin at the blending with the resin due to its low active oxygen content. When the amount of the peroxycarbonate exceeds 20% by weight, there is a risk that the copolymer A gels during the polymerization reaction, or the resulting copolymer A loses the physical properties inherent to (meth)acrylic acid ester copolymer. Accordingly the peroxycarbonate represented by the general formula (I) should not be used in an amount less than 0.5% by weight or more than 20% by weight in the first aspect of the present invention.

In the second aspect of the present invention, a part of the amount of the (meth)acrylic acid ester monomer to be used in the production of copolymer A in the first aspect of the present invention is replaced by a radically copolymerizable monomer copolymerizable with the (meth)acrylic acid ester monomer. That is, in the second aspect of the present invention, a (meth)acrylic acid ester monomer is copolymerized with a radically copolymerizable monomer copolymerizable with the (meth)acrylic acid ester monomer and a radically copolymerizable peroxycarbonate represented by the general formula (I) to produce copolymer A.

In the second aspect, the radically copolymerizable monomer copolymerizable with the (meth)acrylic acid ester monomer is used in order to adjust the glass transition temperature of (meth)acrylic acid ester polymer.

The radically copolymerizable monomers copolymerizable with the (meth)acrylic acid ester monomer include aromatic vinyl monomers, such as styrene, α-methylstyrene, p-methylstyrene and the like; (meth)acrylic acid ester monomers, such as methyl(meth)acrylate, ethyl(meth)acrylate, n-butyl(meth)acrylate and the like; vinyl ester monomers, such as vinyl acetate, vinyl propionate and the like; unsaturated nitrile monomers, such as acrylonitrile, methacrylonitrile and the like; conjugated diene monomers, such as butadiene, isoprene and the like; unsaturated fatty acid monomers, such as acrylic acid; methacrylic acid and the like; α-olefin monomers, such as ethylene, propylene, butene-1 and the like; halogenated vinyl monomers, such as vinyl chloride, vinylidene chloride and the like; and the like. These radically copolymerizable monomers are selected depending upon the use purpose of the resulting block copolymer.

The amount of the (meth)acrylic acid ester monomer to be used in the second aspect of the present invention is 50-99.4% by weight, preferably 60-98.5% by weight, based on the total amount of the monomer mixture for the production of copolymer A, which consists of the (meth)acrylic acid ester monomer, a radically copolymerizable monomer copolymerizable therewith and a radically copolymerizable peroxycarbonate represented by the general formula (I). When the amount of the (meth)acrylic acid ester monomer is less than 50% by weight, the resulting copolymer A has not physical properties inherent to (meth)acrylic acid ester polymer, and the (meth)acrylic acid monomer should not be used in an amount of less than 50% by weight.

The amount of the radically copolymerizable monomer, which is copolymerizable with the (meth)acrylic acid ester monomer, to be used in the second aspect of the present invention is 0.1-30% by weight, preferably 0.5-25% by weight, based on the total amount of the monomer mixture for the production of copolymer A, which consists of a (meth)acrylic acid ester monomer, the radically copolymerizable monomer copolymerizable with the (meth)acrylic acid ester monomer, and a radically copolymerizable peroxycarbonate represented by the general formula (I). When the amount of the radically copolymerizable monomer exceeds 30% by weight, the resulting copolymer A loses noticeably physical properties inherent to (meth)acrylic acid ester copolymer. On the contrary, when the amount of the radically copolymerizable monomer is less than 0.1% by weight, the monomer cannot fully exhibit a property for adjusting the glass transition temperature of the (meth)acrylic acid ester polymer.

Further, in the second aspect of the present invention, it is necessary that the total amount of the (meth)acrylic acid ester monomer and the radically copolymerizable monomer copolymerizable therewith is 80-99.5% by weight, preferably 85-99.0% by weight, based on the total amount of the monomer mixture for the production of copolymer A. When the total amount of the (meth)acrylic acid ester monomer and the radically copolymerizable monomer copolymerizable therewith is less than 80% by weight, the amount of the radically copolymerizable peroxycarbonate represented by the general formula (I) becomes more than 20% by weight. While, when the total amount of the (meth)acrylic acid ester monomer and the radically copolymerizable monomer copolymerizable therewith exceeds 99.5% by weight, the amount of the radically copolymerizable peroxycarbonate represented by the general formula (I) becomes less than 0.5% by weight. Therefore, less than 80% by weight or more than 99.5% by weight, in the total amount, of the (meth)acrylic acid ester monomer and the radically copolymerizable monomer copolymerizable therwith should not be used.

The amount of the radically copolymerizable peroxycarbonate represented by the general formula (I) in the second aspect of the present invention is 0.5-20% by weight, preferably 1-15% by weight, based on the total amount of the monomer mixture for the production of copolymer A, which consists of the (meth)acrylic acid ester monomer, the radically copolymerizable monomer copolymerizable therewith and the radically copolymerizable peroxycarbonate, similarly to the case of the first aspect of the present invention.

In the present invention, monomers to be used for the production of (co)polymer B are not particularly limited so long as (co)polymer B is different from copolymer A in the monomer composition. Because, the monomers are selected depending upon the properties demanded to the block copolymer to be produced in the present invention and upon the purpose for modifying other resin.

In general, the radically copolymerizable monomers are preferably used as the monomer for the production of (co)polymer B. These monomers are, for example, aromatic vinyl monomers, such as styrene, α-methylstyrene, p-methylstyrene and the like; (meth)acrylic acid ester monomers, such as methyl(meth)acrylate, ethyl(meth)acrylate, n-butyl(meth)acrylate and the like; vinyl ester monomers, such as vinyl acetate, vinyl propionate and the like; unsaturated nitrile monomers, such as acrylonitrile, methacrylonitrile and the like; conjugated diene monomers, such as butadiene, isoprene and the like; unsaturated fatty acid monomers, such as acrylic acid, methacrylic acid and the like; α-olefin monomers, such as ethylene, propylene, butene-1 and the like; halogenated vinyl monomers, such as vinyl chloride, vinylidene chloride and the like; and the like.

It is necessary that the block copolymer of the present invention has properties inherent to block copolymer, for example, has a high dispersion stability to other resin. Accordingly, the amount of segments of copolymer A in the block copolymer must be 5–95% by weight, and that of segments of (co)polymer B therein must be 95–5% by weight. When the amount of copolymer A segments is less than 5% by weight and the amount of (co)polymer B segments exceeds 95% by weight, or when the amount of copolymer A segments exceeds 95% by weight and the amount of (co)polymer B segments is less than 5% by weight, the resulting block copolymer has a property inherent to a homo- or random-(co)polymer, is very poor in the dispersability into other resin and in the dispersion stability, and has no longr properties inherent to block copolymer. Therefore, a block copolymer containing less than 5% by weight or more than 95% by weight of copolymer A segments, i.e. containing more than 95% by weight or less than 5% by weight of (co)polymer B segments can not attain the object of the present invention.

The block copolymer of the present invention can be produced by any methods so long as the radically copolymerizable peroxycarbonate represented by the general formula (I) is not decomposed by catalyst and the like. For example, the block copolymer is produced by anion living method, successive reaction method, high polymer reaction method, polymeric peroxide (polymeric azo-compound) method or the like. Among these methods, polymeric peroxide (polymeric azo-compound) method is most preferable. When a block copolymer is produced by this method, it is necessary to take care that the polymerization temperature is kept to not higher than 90° C., preferably not higher than 85° C., in order to carry out a copolymerization reaction without causing the decomposition of the peroxy group due to the reason that the radically copolymerizable peroxycarbonate represented by the general formula (I) has a decomposition temperature at selected half-life value for 10 hours of 95°–105° C. As the polymerization method, there can be used any of bulk polymerization method, suspension polymerization method, emulsion polymerization method, solution polymerization method and the like.

The chemical structure of copolymer A segments in the block copolymer of the present invention can be determined in the following manner. The presence and amount of peroxycarbonate groups are ascertained from the measurement of the amount of active oxygen by the infrared absorption spectrum (characteristic infrared absorption band) and the iodometric method, and the structures of alkyl group, cycloalkyl group and phenyl group are ascertained by the thermal decomposition gas chromatography and nuclear magnetic resonance spectrum, whereby the monomer structure is clarified.

Further, the block efficiency in the production of the block copolymer can be measured by the extraction method or the fractional precipitation method, and the molecular weight and molecular weight distribution of the block copolymer can be measured by the gel permeation chromatography (abbreviated as GPC, hereinafter).

As described above, the block copolymer according to the present invention consists of segments of copolymer A and segments of (co)polymer B, which copolymer A is a (meth)acrylic acid ester copolymer and contains peroxy groups bonded pendently to its main polymer chain. Accordingly, the block copolymer can be used for the modification of other resins, for example, olefin (co)polymers, such as polyethylene, polypropylene, ethylene-propylene copolymer, ethylene-propylene-diene terpolymer, ethylene-vinyl ester copolymer, ethylene-(meth)acrylic acid ester copolymer and the like; condensed type engineering plastics, such as polyphenylene ether, polycarbonate, thermoplastic polyester and the like; cellulose; silicone resin and the like.

As the method for modifying the resins, the following methods can be used. That is, the block copolymer of the present invention is dissolved in a monomer mixture, which is to be polymerized or condensed into a resin to be modified, at the polymerization or condensation reaction of the monomer mixture. Alternatively, it is preferable that when the block copolymer of the present invention is melted and blended together with other resin in a molding machine, such as extruder, injection molding machine, kneader or the like, a grafting reaction of the block copolymer onto the resin is concurrently carried out. In this case, the melting temperature is preferably 150°–300° C.

When the above described operation is carried out, the block copolymer is homogeneously dispersed in other resin (matrix resin) due to the property inherent to the block copolymer, and at the same time the peroxycarbonate groups contained in the block copolymer are decomposed to graft the block copolymer on the matrix resin. As the result, the interfacial strength between the matrix resin and the block copolymer is increased, and further the block copolymer is dispersed into the matrix resin in the form of a smaller particle size.

Moreover, since copolymer A consists of a (meth)acrylic acid ester copolymer, it can be expected that the heat resistance, weather resistance and molding property of the matrix resin are improved.

As described above, the block copolymer of the present invention can modify a matrix resin without deteriorating its mechanical properties.

The present invention will be explained in more detail hereinafter referring to the following Examples, Comparative examples and Reference examples.

EXAMPLE 1

To 100 parts by weight of a monomer mixture, which was to be formed into copolymer A and consisted of 95% by weight of methyl methacrylate and 5% by weight of t-butylperoxy methacryloyloxyethyl carbonate as a radically copolymerizable peroxycarbonate, was added 5 parts by weight of a polymerization initiator of a polymeric peroxide represented by the following formula

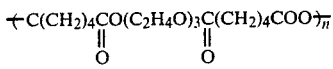

(average condensation degree $\bar{n}=4.5$, theoretical active oxygen content=3.96, and decomposition temperature at selected half-life value for 10 hours=63.5° C.) and the resulting mixture was fully mixed under stirring. Then, the mixture was added to 600 parts by weight of a 1% by weight aqueous solution of polyvinyl alcohol, which had previously been charged in a four-necked flask equipped with a cooler, and subjected to a suspension polymerization reaction at a temperature of 60°–80° C. for 5 hours under stirring. As the result, the conversion degree became 95% or more, and the completion of the polymerization reaction was ascertained, and the polymerization reaction was stopped to obtain copolymer A.

Then, 100 parts by weight of styrene, which was used as a monomer to be formed into (co)polymer B, was added to the above obtained aqueous suspension of the copolymer A, and the resulting mixture was further subjected to a polymerization reaction at a temperature of 70°–85° C. After completion of the polymerization reaction, the polymerization products was filtered, washed with water, and dried to obtain an aimed block copolymer.

The test results of the block copolymer were as follows.
  Active oxygen content: 0.154% by weight
  Number average molecular weight: 125,000
  Block efficiency: 61%
  Conversion degree in polymerization: 98.5%
  Active oxygen content in the non-blocked polystyrene ((co)polymer B): 0.000%

The test methods were as follows.

Active oxygen content was determined by the iodometry.

Number average molecular weight was determined by the GPC measurement.

Block efficiency was determined by extracting non-blocked polystyrene with cyclohexane used as a solvent by means of a Soxhlet extractor.

Conversion degree in polymerization was calculated by the following formula, according to the gravimetric method.

$$\frac{\text{Weight of the resulting block copolymer}}{\text{Weight of the total monomers used}} \times 100$$

Further, the heat distortion temperature of the block copolymer was measured according to JIS K-7207 and was found to be 110°.

COMPARATIVE EXAMPLE 1

A block copolymer was produced in the same manner as described in Example 1, except that methyl methacrylate was used as a monomer to be formed into copolymer A, and t-butylperoxy methacryloyloxyethyl carbonate was not used.

The test results of the resulting block copolymer were as follows.
  Active oxygen content: 0.000% by weight
  Number average molecule weight: 132,000
  Block efficiency: 63%
  Conversion degree in polymerization: 98.5%

EXAMPLES 2–5 AND COMPARATIVE EXAMPLES 2–5

Block copolymers of Example 2–5 and Comparative examples 2–5 were produced in the same manner as described in Example 1 except the following.

In the production of block copolymers of Examples 2–5, the kinds and amounts of monomers to be formed into copolymer A and (co)polymer B, the amount of t-butylperoxy methacryloyloxyethyl carbonate, and the mixing ratio of copolymer A/(co)polymer B shown in Table 1 were used; and in the production of block copolymers of Comparative examples 2–5, those shown in Table 2 were used.

The test results of the resulting block copolymers are shown in Tables 1 and 2.

The test methods were the same as those described in Example 1, except the measurement of the block efficiency.

The block efficiency was measured by the fractional precipitation method, wherein the block copolymer was dissolved in benzene, and the benzene solution was poured into petroleum ether. In Example 3 and Comparative example 4, n-dodecyl mercaptan was used as a chain transfer agent at the polymerization reaction for the production of copolymer B.

In Tables 1 and 2, t-butylperoxy methacryloyloxyethyl carbonate was abbreviated as MEC, methyl methacrylate as MMA, n-butyl acrylate as BA, n-butyl methacrylate as BMA, styrene as ST, and acrylonitrile as AN.

TABLE 1

| Example | | | 2 | 3 | 4 | 5 |
|---|---|---|---|---|---|---|
| Monomer composition (wt %) | Copolymer A | MEC | 2 | 10 | 15 | 5 |
| | | MMA | 98 | | | |
| | | BA | | 90 | 85 | |
| | | BMA | | | | 95 |
| | Copolymer B | ST | 100 | | 70 | 100 |
| | | MMA | | 100 | | |
| | | AN | | | 30 | |
| Copolymer A/copolymer B (wt/wt) | | | 10/90 | 50/50 | 30/70 | 90/10 |
| Active oxygen content (wt %) | | | 0.013 | 0.309 | 0.278 | 0.278 |
| Number average molecular weight | | | 97,000 | 130,000 | 119,000 | 145,000 |
| Block efficiency (%) | | | 53 | 65 | 65 | 73 |
| Conversion degree in polymerization (%) | | | 97.0 | 98.5 | 98.5 | 98.0 |
| Active oxygen content in copolymer (B) (%) | | | 0.000 | 0.000 | 0.000 | 0.000 |
| Appearance 5% Solution in toluene | | | white emulsion | white emulsion | white emulsion | white emulsion |

TABLE 2

| Comparative Example | | | 2 | 3 | 4 | 5 |
|---|---|---|---|---|---|---|
| Monomer composition (wt %) | Copolymer A | MEC | 0.2 | 30 | 10 | 1 |
| | | MMA | | | 90 | |
| | | BA | | 70 | | |
| | | BMA | 99.8 | | | 99 |
| | Copolymer B | ST | 100 | | 70 | 100 |
| | | MMA | | 100 | | |
| | | AN | | | 30 | |
| Copolymer A/copolymer B (wt/wt) | | | 10/90 | 10/50 | 2/98 | 98/2 |
| Active oxygen content (wt %) | | | 0.001 | 0.185 | 0.012 | 0.061 |
| Number average molecular weight | | | 90,000 | gelled | 120,000 | 150,000 |
| Block efficiency (%) | | | 52 | | 47 | 82 |
| Conversion degree in | | | 97.5 | 99.0 | 98.5 | 99.0 |

TABLE 2-continued

| Comparative Example | 2 | 3 | 4 | 5 |
|---|---|---|---|---|
| polymerization (%) | | | | |
| Active oxygen content in copolymer (B) (%) | 0.000 | 0.000 | 0.000 | 0.000 |
| Appearance | white | white | transparent | transparent |
| 5% Solution in toluene | emulsion | insoluble | transparent | transparent |

Tables 1 and 2 illustrate as follows.

In Comparative example 2, MEC is used in a very small amount of only 0.2% by weight for the production of copolymer A, and hence the resulting block copolymer has a very low active oxygen content of only 0.001% by weight. In Comparative example 3, MEC is used in a large amount of 30% by weight for the production of copolymer A, and hence the reaction mixture is gelled during the polymerization. In Comparative examples 4 and 5, the amount of copolymer A or that of (co)polymer B is less than 5% by weight, and hence the resulting block copolymer does not exhibit a property inherent to block copolymer in a solution containing the block copolymer.

EXAMPLE 6

The decomposition temperature of the block copolymer produced in Example 1 was measured by means of a thermobalance. As the result, it was found that the decomposition temperature was 230° C.

COMPARATIVE EXAMPLE 6

A block copolymer was produced in the same manner as described in Example 1, except that a mixture of 95% by weight of vinyl acetate and 5% by weight of t-butylperoxy allyl carbonate was used as a monomer mixture for copolymer A. The resulting block copolymer had the following properties.
Active oxygen content: 0.218% by weight
Number average molecular weight: 98,000
Block efficiency: 67%
Conversion degree in polymerization: 98.0%
Active oxygen content in the non-blocked polystyrene ((co)polymer B): 0.000%

The block copolymer had a decomposition temperature of 160° C. in the measurement by the thermobalance.

REFERENCE EXAMPLE 1

In a Banbury mixer, 90 parts by weight of a matrix resin of an ethylene-vinyl acetate copolymer (trademark: Flowback K-2010, sold by Seitetsu Kagaku Kogyo K.K.) was blended with 10 parts by weight of the block copolymer produced in Example 1 under a melted state at 230° C. for 10 minutes to produce a resin blend. The graft efficiency in the blending, and the flexural modulus and elongation of the resulting resin blend were measured.

The graft efficiency was measured by the fractional precipitation method with the use of a benzene-acetone system.
Graft efficiency: 67%
Flexural modulus: 340 kg/cm$^2$
Eongation: 790%
Flowback K-2010 had a flexural modulus of 205 kg/cm$^2$ and an elongation of 795%.

REFERENCE EXAMPLE 2

In the same manner as described in Reference example 1, 90 parts by weight of a matrix resin of Flowback K-2010 was blended with 10 parts by weight of the block copolymer produced in Comparative example 1 to produce a resin blend. The graft efficiency in the blending, and the flexural modulus and elongation of resulting resin blend, measured in the same manner as described in Reference example 1, were as follows.
Graft efficiency: 7%
Flexural modulus: 250 kg/cm$^2$
Elongation: 270%

REFERENCE EXAMPLE 3

A grafting reaction was effected in the same manner as described in Reference example 1, except that the block copolymer produced in Comparative example 2 was used as a block copolymer. As the result, the graft efficiency was 15%.

EXAMPLE 7

To 30 parts by weight of a monomer mixture, which was to be formed into copolymer A and consisted of 60% by weight of methyl methacrylate, 35% by weight of styrene and 5% by weight of t-butylperoxy methacryloyloxyethyl carbonate as a radically copolymerizable peroxycarbonate, was added 5 parts by weight of a polymerization initiator of a polymeric peroxide represented by the following formula

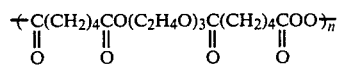

(average condensation degree $\bar{n}=4.5$, theoretical active oxygen content=3.96, and decomposition temperature at selected half-life value for 10 hours=63.5° C.) and the resulting mixture was fully mixed under stirring. Then, the mixture was added to 600 parts by weight of a 1% by weight aqueous solution of polyvinyl alcohol, which had previously been charged in a four-necked flask equipped with a cooler, and subjected to a suspension polymerization reaction at a temperature of 60°-80° C. for 5 hours under stirring. As the result, the conversion degree became 95% or more and the completion of the polymerization reaction was ascertained, and the polymerization reaction was stopped to obtain copolymer A.

Then, 70 parts by weight of styrene, which was used as a monomer to be formed into (co)polymer B, was added to the above obtained aqueous solution of the copolymer A, and the resulting mixture was further subjected to a polymerization reaction at a temperature of 70°-85° C. After completion of the polymerization reaction, the polymerization product was filtered, washed with water, and dried to obtain an aimed block copolymer.

The test results of the block copolymer were as follows.
Active oxygen content: 0.088% by weight
Number average molecular weight: 85,000
Block efficiency: 59%
Conversion degree in polymerization: 98%
Active oxygen content in the non-blocked polystyrene ((co)polymer B: 0.000%

The test methods were the same as those in Example 1.

Further, the heat distortion temperature of the block copolymer was measured according to JIS K-7207 and was found to be 110° C.

COMPARATIVE EXAMPLE 7

A block copolymer was produced in the same manner as described in Example 7, except that a mixture of 65% by weight of methyl(meth)acrylate and 35% by weight of styrene was used as a monomer to be formed into copolymer A and t-butylperoxy methacryloyloxyethyl carbonate was not used.

The test results of the resulting block copolymer were as follows.

Active oxygen content: 0.000% by weight
Number average molecular weight: 83,000
Block efficiency: 61%
Conversion degree in polymerization: 98.0%

EXAMPLES 8–16 AND COMPARATIVE EXAMPLES 8–11

Block copolymers of Examples 8–16 and Comparative examples 8–11 were produced in the same manner as described in Example 7 except the following.

In the production of block copolymers of Examples 8–16, the kinds and amounts of monomers to be formed into copolymer A and (co)polymer B, the amount of t-butylperoxy methacryloyloxyethyl carbonate, and the mixing ratio of copolymer A/(co)polymer B shown in Table 3 were used; and in the production of block copolymers of Comparative examples 8–11, those shown in Table 4 were used.

The test results of the resulting block copolymers are shown in Tables 3 and 4.

The test methods were the same as those described in Examples 2–5 and Comparative examples 2–5.

At the polymerization reaction for the production of copolymer B, n-dodecyl mercaptan was used as a chain transfer agent.

In Tables 3 and 4, the abbreviations of MEC, MMA, BA, ST and AN have the same meanings as those in Tables 1 and 2.

Tables 3 and 4 illustrate as follows.

In Comparative example 2, MEC is used in a very small amount of only 0.1% by weight for the production of copolymer A, and hence the resulting block copolymer has a very low oxygen content of only 0.001%. In Comparative example 9, MEC is used in a large amount of 30% by weight for the production of copolymer A, and hence the reaction mixture is gelled during the polymerization. In Comparative examples 10 and 11, the amount of copolymer A or that of copolymer B is less than 5% by weight, and hence the resulting block copolymer does not exhibit a property inherent to block copolymer in a solution containing the block copolymer.

EXAMPLE 17

The decomposition temperature of the block copolymer produced in Example 7 was measured by means of a thermobalance. As the result, it was found that the decomposition temperature was 225° C.

COMPARATIVE EXAMPLE 12

A block copolymer was produced in the same manner as described in Example 7, except that a mixture of 95% by weight of vinyl acetate and 5% by weight of t-butylperoxy allyl carbonate was used as a monomer mixture for copolymer A. The resulting block copolymer had the following properties.

Active oxygen content: 0.218% by weight
Number average molecular weight: 95,000
Block efficiency: 68%
Conversion degree in polymerization: 98%
Active oxygen content in the non-blocked polystyrene ((co)polymer B): 0.000%

TABLE 3

| Example | | | 8 | 9 | 10 | 11 | 12 | 13 | 14 | 15 | 16 |
|---|---|---|---|---|---|---|---|---|---|---|---|
| Monomer composition (wt %) | Copolymer A | MEC | 5 | 5 | 5 | 0.5 | 10 | 15 | 10 | 10 | 10 |
| | | MMA | 90 | 70 | | 79.5 | 70 | 65 | 70 | 70 | 70 |
| | | BA | | | 70 | | | | | | |
| | | ST | 5 | 25 | 25 | 20 | 20 | 20 | 20 | 20 | 20 |
| | Copolymer B | ST | 70 | 70 | 70 | 70 | 70 | 70 | 70 | 70 | 70 |
| | | MMA | 30 | | | 30 | 30 | 30 | 30 | 30 | 30 |
| | | AN | | 30 | 30 | | | | | | |
| Copolymer A/copolymer B (wt/wt) | | | 30/70 | 30/70 | 30/70 | 10/90 | 10/90 | 10/90 | 30/70 | 50/50 | 90/10 |
| Active oxygen content (wt %) | | | 0.087 | 0.083 | 0.083 | 0.003 | 0.059 | 0.088 | 0.175 | 0.293 | 0.527 |
| Number average molecular weight | | | 93,000 | 89,000 | 95,000 | 75,000 | 82,000 | 97,000 | 97,000 | 132,000 | 113,000 |
| Block efficiency (%) | | | 62 | 60 | 63 | 56 | 54 | 59 | 59 | 65 | 69 |
| Active oxygen content in copolymer (B) (%) | | | 0.000 | 0.000 | 0.000 | 0.000 | 0.000 | 0.000 | 0.000 | 0.000 | 0.000 |
| Appearance | | | white | white | white | white | white | white | white | white | white |
| 5% Solution in toluene | | | emulsion | emulsion | emulsion | emulsion | emulsion | emulsion | emulsion | emulsion | emulsion |

TABLE 4

| Comparative Example | | | 8 | 9 | 10 | 11 |
|---|---|---|---|---|---|---|
| Monomer composition (wt %) | Copolymer A | MEC | 0.1 | 30 | 10 | 10 |
| | | MMA | 79.9 | 55 | 70 | 70 |
| | | BA | | | | |
| | | ST | 20 | 15 | 20 | 20 |
| | Copolymer B | ST | 70 | 70 | 70 | 70 |
| | | MMA | 30 | 30 | 30 | 30 |
| | | AN | | | | |
| Copolymer A/copolymer B (wt/wt) | | | 10/90 | 10/90 | 2/98 | 98/2 |
| Active oxygen content (wt %) | | | 0.001 | gelled | 0.012 | 0.573 |
| Number average molecular weight | | | 69,000 | | 79,000 | 141,000 |
| Block efficiency (%) | | | 55 | | 56 | 77 |
| Active oxygen content in copolymer (B) (%) | | | 0.000 | 0.000 | 0.000 | |
| Appearance | | | white | white | transparent | transparent |
| 5% Solution in toluene | | | emulsion | | transparent | transparent |

The block copolymer had a decomposition temperature of 165° C. in the measurement by the thermobalance.

REFERENCE EXAMPLE 4

In the same manner as described in Reference example 1, 90 parts by weight of a matrix resin of Flowback K-2010 was blended with 10 parts by weight of the block copolymer produced in Example 7 to produce a resin blend. The graft efficiency in the blending and the flexural modulus and elongation of the resulting resin blend, measured in the same manner as described in Reference example 1, were as follows.

Graft efficiency: 64%
Flexural modulus: 355 kg/cm$^2$
Elongation: 770%

REFERENCE EXAMPLE 5

In the same manner as described in Reference example 1, 90 parts by weight of a matrix resin of Flowback K-2010 was blended with 10 parts by weight of the block copolymer produced in Comparative example 7 to produce a resin blend. The graft efficiency in the blending, and the flexural modulus and elongation of the resulting resin blend, measure in the same manner as described in Reference example 1, were as follows.

Graft efficiency: 7%
Flexural modulus: 270 kg/cm$^2$
Elongation: 250%

REFERENCE EXAMPLE 6

A grafting reaction was effected in the same manner as described in Reference example 1, except that the block copolymer produced in Comparative example 8 was used as a block copolymer. As the result, the graft efficiency was 15%.

What is claimed is:

1. A block copolymer consisting of
   (a) 5-95% by weight of segments consisting of copolymer A, which has been obtained by radically copolymerizing 80-99.5% by weight of a (meth)acrylic acid ester monomer with 0.5-20% by weight of a radically copolymerizable peroxycarbonate represented by the following general formula (I), and
   (b) 95-5% by weight of segments consisting of (co)polymer B, which has been obtained by polymerizing at least one radically (co)polymerizable monomer in the absence of the radically copolymerizable peroxycarbonate represented by the general formula (I), and is different in the monomer composition from the above described copolymer A, said general formula (I) being

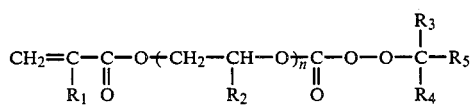

wherein $R_1$ represents a hydrogen atom or an alkyl group having 1 or 2 carbon atoms; $R_2$ represents a hydrogen atom or a methyl group; $R_3$ and $R_4$ represent same or different alkyl groups having 1-4 carbon atoms; $R_5$ represents a phenyl group or an alkyl group or alkyl-substituted phenyl group having 1-12 carbon atoms or a cycloalkyl group having 3-12 carbon atoms; and n is a positive integer of 1 or 2.

2. A block copolymer consisting of
   (a) 5-95% by weight of segments consisting of copolymer A, which has been obtained by radically copolymerizing 50-99.4% by weight of a (meth)acrylic acid ester monomer with 0.1-30% by weight of a monomer copolymerizable with the (meth)acrylic acid ester monomer and 0.5-20% by weight of a radically copolymerizable peroxycarbonate represented by the following general formula (I), and
   (b) 95-5% by weight of segments consisting of (co)polymer B, which has been obtained by polymerizing at least one radically (co)polymerizable monomer in the absence of the radically copolymerizable peroxycarbonate represented by the general formula (I), and is different in the monomer composition from the above described copolymer A, said general formula (I) being

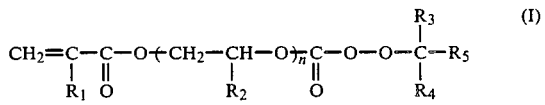

wherein $R_1$ represents a hydrogen atom or an alkyl group having 1 or 2 carbon atoms; $R_2$ represents a hydrogen atom or a methyl group; $R_3$ and $R_4$ represent same or different alkyl groups having 1-4 carbon atoms; $R_5$ represents a phenyl group or an alkyl group or alkyl-substituted phenyl group having 1-12 carbon atoms or a cycloalkyl group having 3-12 carbon atoms; and n is a positive integer of 1 or 2.

3. A block copolymer according to claim 1, wherein the block copolymer contains at least 0.002% by weight of active oxygen.

4. A block copolymer according to claim 1, wherein the radically copolymerizable peroxycarbonate represented by the general formula (I) is t-butylperoxy methacryloyloxyethyl carbonate.

5. A block copolymer according to claim 1, wherein the (meth)acrylic acid ester monomer to be used for the production of copolymer A is n-butyl acrylate.

6. A block copolymer according to claim 1, wherein the (meth)acrylic acid ester monomer to be used for the production of copolymer A is methyl methacrylate.

7. A block copolymer according to claim 1, wherein the (meth)acrylic acid ester monomer to be used for the production of copolymer A is n-butyl (meth)acrylate.

8. A block copolymer according to claim 1, wherein the copolymer B is a polymerization product of a monomer mixture containing not less than 50% by weight of at least one aromatic vinyl monomer.

9. A block copolymer according to claim 1, wherein the copolymer B is a polymerization product of a monomer mixture containing not less than 50% by weight of at least one (meth)acrylic acid ester monomer.

* * * * *